US007889372B2

(12) United States Patent
Iwasaki

(10) Patent No.: US 7,889,372 B2
(45) Date of Patent: Feb. 15, 2011

(54) IMAGE FORMING DEVICE THAT SETS INITIAL VALUE OF PRINTER OPERATION MODE ACCORDING TO MANAGEMENT MODE

(75) Inventor: Takao Iwasaki, Tama (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1078 days.

(21) Appl. No.: 11/427,241

(22) Filed: Jun. 28, 2006

(65) Prior Publication Data

US 2007/0002354 A1 Jan. 4, 2007

(30) Foreign Application Priority Data

Jun. 30, 2005 (JP) ............................ 2005-193029

(51) Int. Cl.
*G06F 3/12* (2006.01)
*G03G 21/02* (2006.01)

(52) U.S. Cl. ........................ 358/1.15; 358/1.13; 399/79

(58) Field of Classification Search ................ 358/1.13, 358/1.15; 399/79
See application file for complete search history.

(56) References Cited

U.S. PATENT DOCUMENTS 6,597,469 B1 * 7/2003 Kuroyanagi ............... 358/1.15
2003/0202199 A1 * 10/2003 Carter et al. ............... 358/1.13

FOREIGN PATENT DOCUMENTS

| | | |
|---|---|---|
| JP | 2003-271367 | 9/2003 |
| JP | 2004-122778 | 4/2004 |
| JP | 2003-308201 | 10/2004 |
| JP | 2004-361688 | 12/2004 |

OTHER PUBLICATIONS

Japanese Office Action dated Nov. 17, 2009, Japanese Application No. 2005-193029 with English translation.

* cited by examiner

*Primary Examiner*—Twyler L Haskins
*Assistant Examiner*—Fred Guillermety
(74) *Attorney, Agent, or Firm*—Patterson & Sheridan, LLP

(57) ABSTRACT

An image forming device has a printer capable of selectively setting a first operation mode to print an image on a medium and a second operation mode to print an image on the medium, the first operation mode being different from the second operation mode, and a display unit which displays an operation screen, and sets an initial value of the operation mode of the printer to the second operation mode, in a case where a management mode is designated to manage only the number of pages printed in the first operation mode by the printer for each division to which each user belongs. The image forming device displays in the display unit that the printer is brought into the second operation mode based on the initial value of the operation mode of the printer in an initial state.

15 Claims, 7 Drawing Sheets

IMAGE FORMING DEVICE THAT SETS INITIAL VALUE OF PRINTER OPERATION MODE ACCORDING TO MANAGEMENT MODE

CROSS-REFERENCE TO RELATED APPLICATIONS

This application is based upon and claims the benefit of priority from prior Japanese Patent Application No. 2005-193029, filed Jun. 30, 2005, the entire contents of which are incorporated herein by reference.

BACKGROUND OF THE INVENTION

1. Field of the Invention

The present invention relates to an image forming device such as a digital multifunction machine having a division management function which manages use results such as the number of pages printed for each division, and a method of managing the image forming device.

2. Description of the Related Art

Heretofore, among image forming devices such as a digital multifunction machine, there is a device having a function which manages the number of printed pages. In an image forming device such as the digital multifunction machine or a printer having a network communication function, there is assumed an operation mode in which the device is utilized by a large number of users. Among such image forming devices, there is a device having a function referred to as a division management function which manages the number of pages printed by each management unit referred to as a division. In this division management function, a division counter set in each division counts the number of the pages printed by each division.

BRIEF SUMMARY OF THE INVENTION

In one aspect of this invention, an object is to provide an image forming device capable of appropriately managing use results in accordance with user's request and improving user's operability, and a method of managing the image forming device.

An image forming device as one aspect of this invention has: a printer having a first operation mode to print an image on a medium and a second operation mode to print an image on the medium, the first operation mode being different from the second operation mode; a display unit which displays an operation screen; a management unit having a management mode to manage only the number of pages printed in the first operation mode by the printer for each division to which a user belongs; and a setting unit which sets an initial value of the operation mode of the printer to the second operation mode, the initial value being displayed in the display unit, in a case where the management mode is valid in which the management unit manages only the number of the pages printed in the first operation mode for each division, each user belonging to the division.

As another aspect of this invention, in an image forming device including a printer having a first operation mode and a second operation mode which is different from the first operation mode and a display unit, a method of managing the image forming device: sets an initial value of the operation mode of the printer to the second operation mode, in a case where a management mode is designated which manages only the number of pages printed in the first operation mode by the printer for each division, each user belonging to the division;

and displaying in the display unit that the printer is brought into the second operation mode based on the initial value of the operation mode of the printer, in a case where the image forming device is brought into an initial state.

An image forming device as still another aspect of this invention has: image forming means having a first operation mode to form an image on an image forming medium and a second operation mode to form an image on the image forming medium, the first operation mode being different from the second operation mode; display means for displaying an operation screen; management means having a management mode to manage only the number of pages having the image formed thereon in the first operation mode by the image forming means for each division to which each user belongs; and setting means for setting an initial value of the operation mode of the image forming means to the second operation mode, the initial value being displayed in the display means, in a case where the management mode is valid in which the management means manages only the number of the pages having the image formed thereon in the first operation mode for each division, each user belonging to the division.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
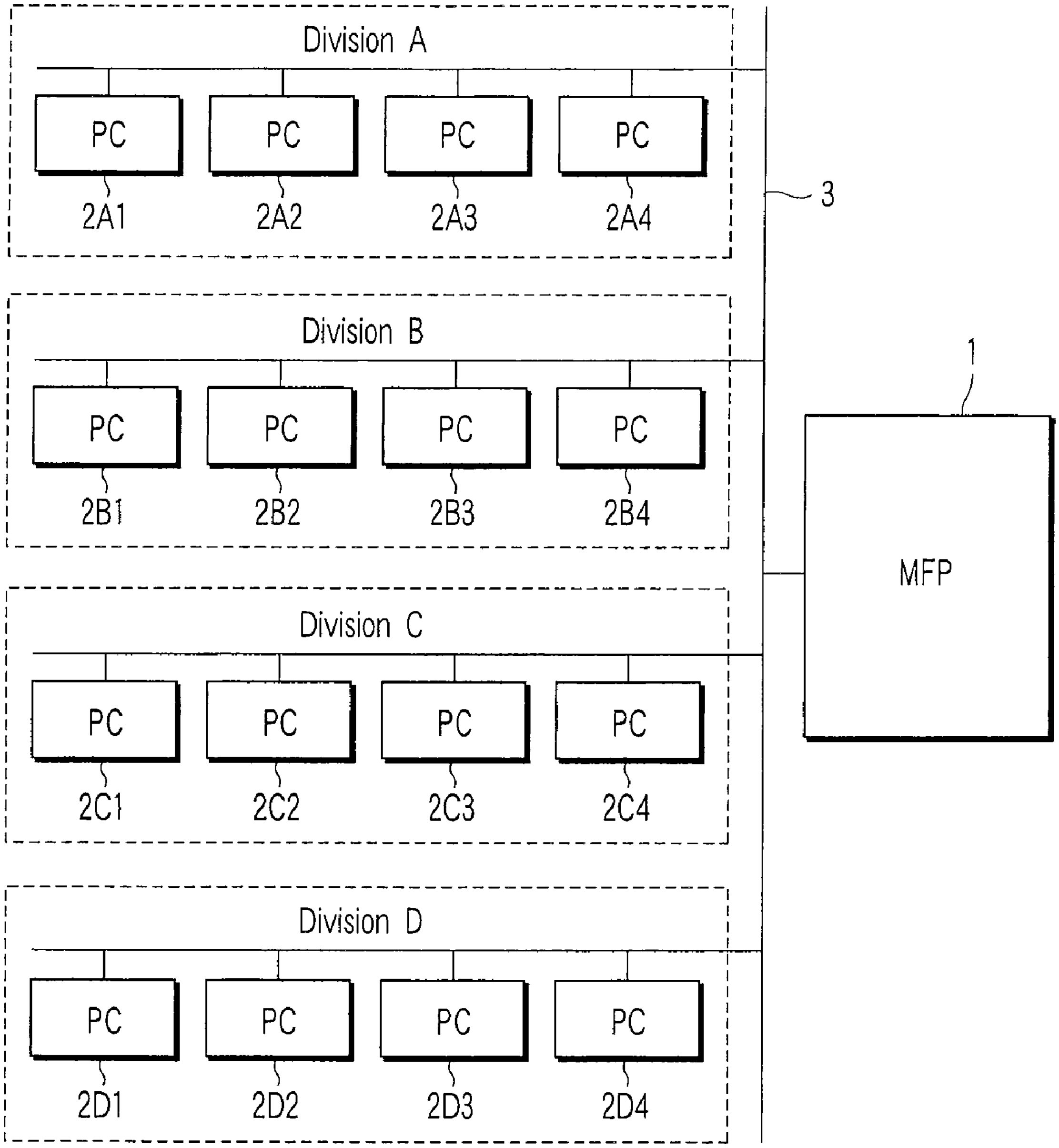
FIG. 1 is a diagram schematically showing a constitution example of an image forming system in an embodiment of the present invention.

An embodiment for carrying out this invention will be described hereinafter with reference to the drawing.

FIG. 1 is a diagram showing a schematic constitution of an image forming system in the embodiment of this invention.

As shown in FIG. 1, in this image forming system, a digital multifunction machine (multifunction peripheral [MFP]) 1 as an image forming device is connected to a plurality of personal computers (PCs) 2 (2A1 to 2A4, 2B1 to 2B4, 2C1 to 2C4 and 2D1 to 2D4) by a network 3 such as a local area network (LAN).

The MFP 1 mainly has a printer function, a scanner function, a photocopying function, a facsimile transmitting and receiving function and the like. The MFP 1 has a function which processes a color image and a function which processes a monochromatic image.

That is, the MFP 1 has: a color scanning function which chromatically reads an image of a draft; a monochromatic scanning function which monochromatically reads the image of the draft; a color printing function which forms a color image on an image forming medium; and a monochromatic printing function which forms a monochromatic image on the image forming medium.

Accordingly, the MFP 1 realizes color photocopy and monochromatic photocopy as the photocopying function, and realizes color print and monochromatic print as the printer (network printing) function. It is to be noted that as the facsimile receiving function, the monochromatic print is performed.

Each PC 2 is constituted of a main body having a network interface (not shown), a display unit (not shown), an operation unit (not shown) and the like. The PC 2 has a function which requests the MFP 1 to print the image via the network 3. In the function which requests the MFP 1 to print the image, each PC 2 transmits color image data or monochromatic image data as printing image data.

For example, when the PC 2 requests the MFP 1 to print the color image data, the peripheral performs the color print based on the color image data received by a network printing function. When the PC 2 requests the MFP 1 to print the monochromatic image data, the peripheral performs the monochromatic print based on the monochromatic image data received by the network printing function.

Moreover, it is assumed that the PCs 2 (2A1 to 2A4, 2B1 to 2B4, 2C1 to 2C4 and 2D1 to 2D4) are assigned to the users divided into groups referred to as divisions, respectively. Here, the division refers to the group to which each user having each PC 2 assigned thereto belongs. In an organization such as a company, it is assumed that a department, a section or the like as a place to which each of a plurality of users belongs corresponds to the division.

In a constitution example shown in FIG. 1, it is indicated that a plurality of PCs 2A1 to 2A4 are used by the users who belong to a division A. In FIG. 1, it is also indicated that a plurality of PCs 2B1 to 2B4 are used by the users who belong to a division B. It is further indicated in FIG. 1 that a plurality of PCs 2C1 to 2C4 are used by the users who belong to a division C. It is further indicated in FIG. 1 that a plurality of PCs 2D1 to 2D4 are used by the users who belong to a division D.

Next, there will be described a constitution of a control system of the MFP 1.

Figure 2:
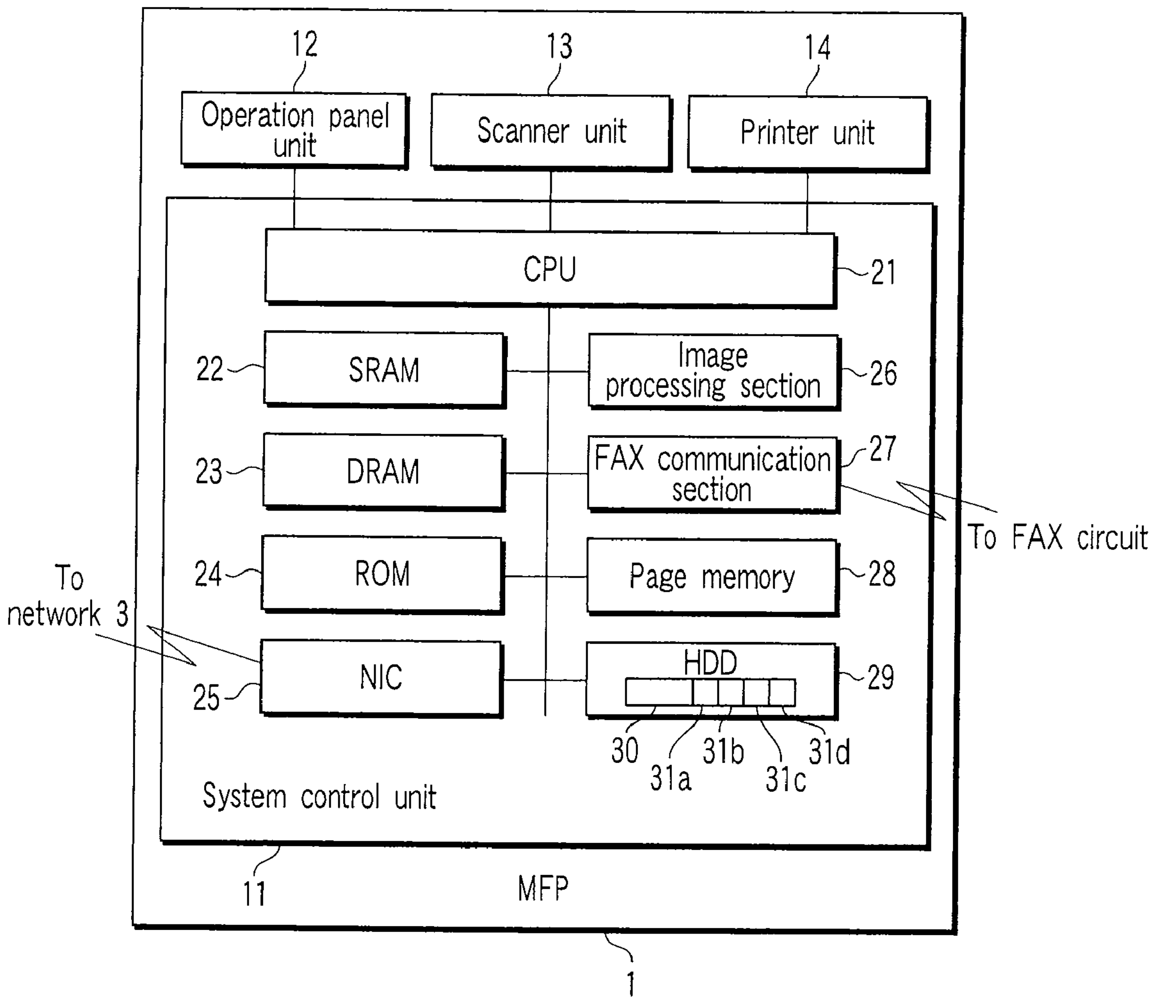
FIG. 2 is a block diagram schematically showing a constitution example of a digital multifunction machine.

FIG. 2 is a block diagram showing a constitution example of the control system of the MFP 1.

As shown in FIG. 2, this MFP 1 is constituted of a system control unit 11, an operation panel 12, a scanner unit 13, a printer unit 14 and the like.

The system control unit 11 controls the whole MFP 1. The system control unit 11 is connected to the operation panel 12, the scanner unit 13, the printer unit 14 and the like. Accordingly, the system control unit 11 accepts an operation instruction input into the operation panel 12, controls the scanner unit 13, or controls the printer unit 14. In addition to the function which controls the scanner unit 13 and the printer unit 14, the system control unit 11 also has functions which perform various types of processing such as network communication control, facsimile transmission and reception, division (or user) authentication, data management, image judgment and image correction.

The operation panel 12 is a user interface. The operation panel 12 is constituted of hardware keys (not shown), a display device (not shown) containing a touch panel and the like. The operation panel 12 displays an operation guidance and the like, and an operation instruction is input. Settings of various types of functions, setting information and the like are input by the operation panel 12. There will be described later in detail a constitution example of the operation panel 12 and a display control with respect to a display unit in the operation panel 12.

The scanner unit 13 converts the draft image into image data. The scanner unit 13 converts the draft image into chromatic or monochromatic digital image data. The scanner unit 13 is constituted of: a scanning section (not shown) which optically scans a draft face; a photoelectric converting section (not shown) such as a CCD line sensor which converts, into an electric signal, reflected light from the draft face optically scanned by the scanning section and the like. The scanner unit 13 supplies the digital image data as the read draft image to the system control unit 11.

The printer unit 14 forms the image on the image forming medium. The printer unit 14 has: a color printing function which forms a color image on the image forming medium based on the color image data; and a monochromatic printing function which forms a monochromatic image on the image forming medium based on the monochromatic image data. The printer unit 14 is constituted of: a conveying section (not shown) which conveys the image forming medium; an image forming section (not shown) which forms a color image or a monochromatic image on the image forming medium conveyed by the conveying section and the like. The printer unit 14 prints the image data of each page on the image forming medium based on the control performed by the system control unit 11.

Moreover, as shown in FIG. 1, the system control unit 11 is constituted of: a central processing unit (CPU) 21; a static random access memory (SRAM) 22; a dynamic random access memory (DRAM) 23; a read only memory (ROM) 24; a network communication section 25; an image processing section 26; a facsimile (FAX) communicating section 27; a page memory 28; a hard disk drive (HDD) 29 and the like.

The CPU 21 controls the whole system control unit 11. The CPU 21 operates based on a control program to perform various types of processing. The CPU 21 is connected to the operation panel 12, the scanner unit 13, the printer unit 14 and the like. The CPU 21 is provided with a timer 21*a* for counting an elapsed time or the like.

The SRAM 22 is backed up by a battery (not shown), and used as a memory which stores system setting information and the like. Data for changing and the like are stored in the SRAM 22. For example, a counter value of the number of the pages printed by a division management function described later is counted up in a counter set in the SPAM 22.

The DRAM 23 is a memory which temporarily stores data for operation or stores data to be referred to. The DRAM 23 is used as a main memory. In a case where, for example, the system setting information and the like are referred to from the outside, the information stored in the DRAM 23 is referred to.

The ROM 24 is a nonvolatile memory. In the ROM 24, there are stored, for example, the control program, control data and the like for controlling the MFP 1. The network communication section 25 controls data communication via the network 3. The network communication section 25 is constituted of a network interface card (NIC) to be connected to the network 3 and the like. In the network communication section 25, a network printer function receives a request for printing the printing image data and the like from each PC 2 via the network 3.

The image processing section 26 subjects the image data to various types of image processing. The image processing section 26 is constituted of an image processing circuit and the like. The image processing section 26 performs image processing such as correction, compression or extension of the image data. The facsimile communicating section 27 is an interface which transmits and receives facsimile data. For example, facsimile reception processing is realized by monochromatically printing, by the printer unit 14, facsimile data received by the facsimile communicating section 27, and facsimile transmission processing is realized by converting the draft image data read by the scanner unit 13 into facsimile data, and transferring the data to a destination by the facsimile communicating section 27.

The page memory 28 is a memory having at least a storage region to develop the image data for one page to be printed by the printer unit 14. The page memory 28 is controlled by a page memory controller (not shown). For example, in a case where the printer unit 14 performs the print processing, in the page memory 28, there is developed (stored) the color image data or the monochromatic image data of each page to be printed by the printer unit 14.

The HDD 29 is a large-capacity storage device. The HDD 29 is also used as a memory for backup of various types of data, and various types of setting data or management data are stored. In the HDD 29, there is stored data received via the network 3, the image data read by the scanner unit 13 or the like, if necessary. In the present embodiment, in the HDD 29, there is stored division management information such as a division code corresponding to a division constituting a management object of the division management function described later.

Moreover, the HDD 29 is provided with: a division undefined counter 30 in which the corresponding division is not defined; a division counter 31 (31*a*, 31*b*, 31*c* and 31*d*) for each division constituting the management object of the division management function as the division management means and the like. The division undefined counter 30 is a counter which is not associated with any specific division (a counter in which the division is not defined). The division counters 31*a*, 31*b*, 31*c* and 31*d* are counters associated with the divisions as the management objects, respectively, by the division management function.

It is to be noted that in the constitution example shown in FIG. 2, there is assumed a case where, as shown in FIG. 1, the divisions A, B, C and D are set as the divisions constituting the management objects of the MFP 1. Therefore, in the MFP 1, the divisions A, B, C and D are set as the management objects of the division management function described later. In this case, in the HDD 29, there are stored division management information such as the division codes corresponding to the divisions A, B, C and D, and there are arranged the division counters 31*a*, 31*b*, 31*c* and 31*d* associated with the divisions A, B, C and D as the divisions constituting the management objects. That is, the division counter 31 is set for each division constituting the management object of the division management function of the MFP 1.

Next, a constitution of the operation panel 12 will be described.

Figure 3:
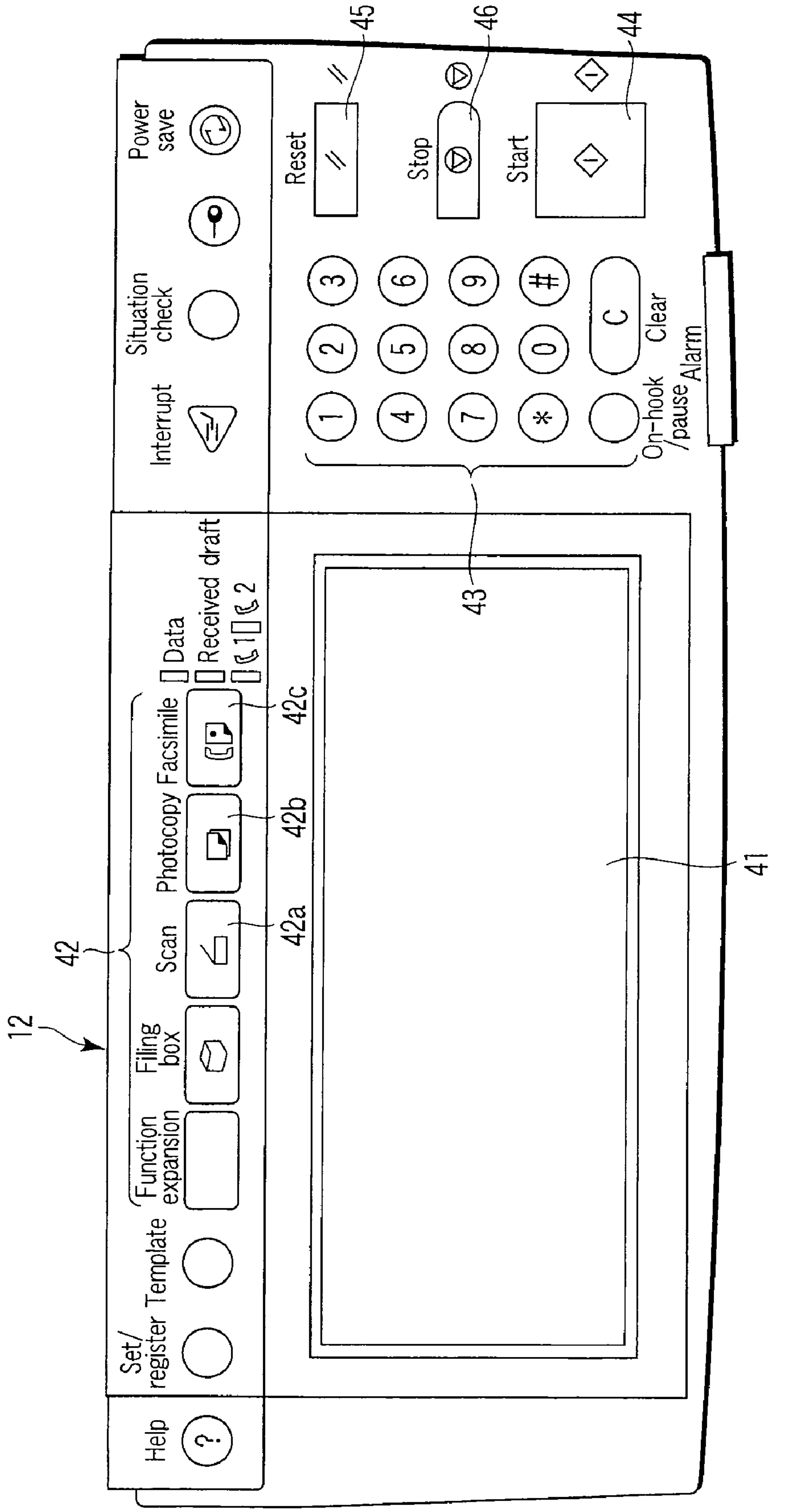
FIG. 3 is a diagram showing a constitution example of an operation panel.

FIG. 3 is an appearance diagram showing the whole constitution of the operation panel 12.

As shown in FIG. 3, the operation panel 12 is provided with a display section 41, function setting keys 42, ten keys 43, a start key 44, a reset key 45, a stop key 46 and the like.

The display section 41 is constituted of a liquid crystal display unit containing a touch panel. In the display section 41, there are displayed various operation screens operable by the touch panel. There will be described later in detail a display example of the operation screen to be displayed in the display section 41. The function setting keys 42 are hardware keys for selecting various functions. As the function setting keys 42, there are arranged, for example, a scanning function selection key 42*a* for selecting a scanning function, a photocopying function selection key 42*b* for selecting a photocopying function, an FAX function selection key 43*c* for selecting a facsimile function and the like.

The ten keys 43 are hardware keys for inputting numerals. The ten keys 43 are used in inputting information such as the number of sheets to be photocopied and a division code. The start key 44 is a hardware key for instructing start of an operation. For example, in the photocopying function, a photocopying operation is started in response to an instruction of the start key 44. The reset key 45 is a hardware key for instructing reset of set contents or the like. For example, setting input into the touch panel of the display section 41 or the like is reset in response to the reset key. The stop key 46 is a hardware key for instructing the MFP to discontinue an operation being executed. For example, when the stop key 46 is indicated during the photocopying operation of the MFP, the photocopying operation is discontinued.

Moreover, in addition to the above various keys, the operation panel 12 shown in FIG. 3 is provided with: a help (HELP) key which instructs display of a user guidance; a set/register key which instructs execution of setting or registering; an interrupt key which requests interruption of the operation; a situation check key for checking a state of the MFP; a lock key for performing a security setting or the like; a power saving key for switching a power saving operation mode which reduces a power consumption and a usual operation mode; an on-hook/pause key for setting an on-hook state as a phone function; a clear key for clearing the numerals input by the ten keys; an alarm display unit for notifying an abnormality in the MFP and the like.

Next, there will be described the color print and the monochromatic print in the MFP 1 constituted as described above.

Here, it is assumed that the MFP 1 manages various types of processing such as a series of photocopy processing, scan processing and print processing every unit referred to as a job. For example, the photocopy processing executed in accordance with one instruction is managed as a photocopying job. The photocopy processing includes: the scan processing to read a draft image; and the print processing to print the image read by the scan processing. Therefore, the photocopying job may be managed by a scanning job and a printing job.

Furthermore, the MFP 1 has a monochromatic photocopying mode, a color (full color) photocopying mode and an auto color mode as the above photocopying function. The monochromatic photocopying mode is a mode to read the draft image as the monochromatic image, and monochromatically print the read monochromatic image on the image forming medium. The color photocopying mode is a mode to read the draft image as the color image, and chromatically print the read color image on the image forming medium. In the auto color mode, it is judged whether the draft image is chromatic or monochromatic, and color photocopy (color scan and color print) or monochromatic photocopy (color scan and monochromatic print) is executed in accordance with the judgment result.

Moreover, the MFP 1 as the network printing function selectively executes the color print or the monochromatic print in accordance with printing image data received together with a printing request from each PC 2. The MFP 1 as the network printing function receives one printing request to manage, as a printing job, print processing in response to the request.

Next, there will be described the division management function of the MFP 1.

The division management function of the MFP 1 is a function of division management means for managing use results (the number of printed pages, etc.) of the MFP 1 for each division. For example, in the image forming system shown in FIG. 1, the division management function of the MFP 1 manages the number of the pages printed for each division or limits the number of printable pages for each division. It is to be noted that the division management function is set to be valid or invalid by an operation of the operation panel 12.

Moreover, in the HDD 29 or the like, there is stored division management information (information such as the division code and the division counter) on the division as a management object of the division management function. That is, the division to be managed by the division management function is set beforehand as the division management information assigned with the division code for identifying the division. As the division management information, there is also defined (set) the division counter 31 associated with the division code. The division counter 31 is a counter which counts the number of the pages printed for each division. In a case where an upper limit of the number of the pages printed for each division is set, the upper limit of the number of the printed pages is also stored as a part of the division management information in the HDD 29. It is to be noted that in a case where the color management function described later is valid, the upper limit of the number of only the chromatically printed pages may be set as a part of the division management information in the HDD 29.

For example, in the image forming system shown in FIG. 1, the divisions constituting the management objects are the divisions A, B, C and D. In this case, unique division codes are set to the divisions (divisions A, B, C and D), respectively. In a case where the thus set division management function is valid, the MFP 1 identifies the division to which the user belongs based on the division code designated by the user.

For example, in a case where the photocopying function is utilized in a state in which the division management function is valid, the user inputs the division code by the operation panel 12 of the MFP 1. When the user inputs the division code by the operation panel 12, the MFP 1 authenticates the user's division based on the division code input by the user and the division code as the division management information set beforehand. Accordingly, when the user's division is identified, the MFP 1 is brought into a state in which the photocopy is possible in response to the user's operation. When the user operates the operation panel 12 to request desired photocopy in this state, the MFP 1 executes the requested photocopy processing, and manages the number of the pages printed as photocopies, as use results of the identified the division.

Moreover, in a case where the network printing function is utilized in a state in which the division management function is valid, the user operates each PC 2 to designate the printing image data and the division code of the division to which the user belongs. In this case, the PC 2 transmits a printing request including the printing image data and the division code to the MFP 1 via the network 3. On receiving the printing request from the PC 2 via the network 3, the MFP 1 authenticates the user's division based on the division code included in the received printing request and the division code as the division management information set beforehand. Accordingly, when the user's division is identified, the MFP 1 executes the print processing based on the received printing image data, and manages the number of the pages printed in the print processing as the use results of the identified division.

Next, there will be described a color management (management for color only) function to be performed in a case where the division management function is valid.

The MFP 1 has the color management (management for color only) function which manages only the number of the chromatically printed pages for each division, when the division management function is valid. This color management function is a function of limiting management means for counting only the number of the chromatically printed pages for each division in the division management function. In other words, the color management function is a function (a function which does not manage the monochromatic print for each division) which does not count the number of monochromatically printed pages in the division counter.

In the MFP 1 having a state in which the above color management function is valid, the number of the monochromatically printed pages is not regarded as the management object, and only the number of the chromatically printed pages is managed. That is, in a state in which the color management function is valid, the number of the chromatically printed pages is counted in the division counter 31 disposed for each division, and the number of the monochromatically printed pages is counted in the division undefined counter 30. As a result, when the color management function is valid, the monochromatic print is limitlessly performed even in a state in which the division is not identified.

In general, in the monochromatic print, consumption of a developer such as toner, a photosensitive member or the like is small, and cost is small as compared with the color print. The monochromatic print is utilized in performing miscellaneous daily printings in many cases. In such situation, there is a case where any restriction is not imposed on the monochromatic print, and only the color print is requested to be managed. In such case, the above color management function is required. According to the color management function, the monochromatic print can limitlessly be performed, and only the use results of the color print can be managed.

Next, there will be described a printing control in a case where the printing job is generated by the photocopying function, the network printing function or the like in the MFP 1 constituted as described above.

Figure 4:
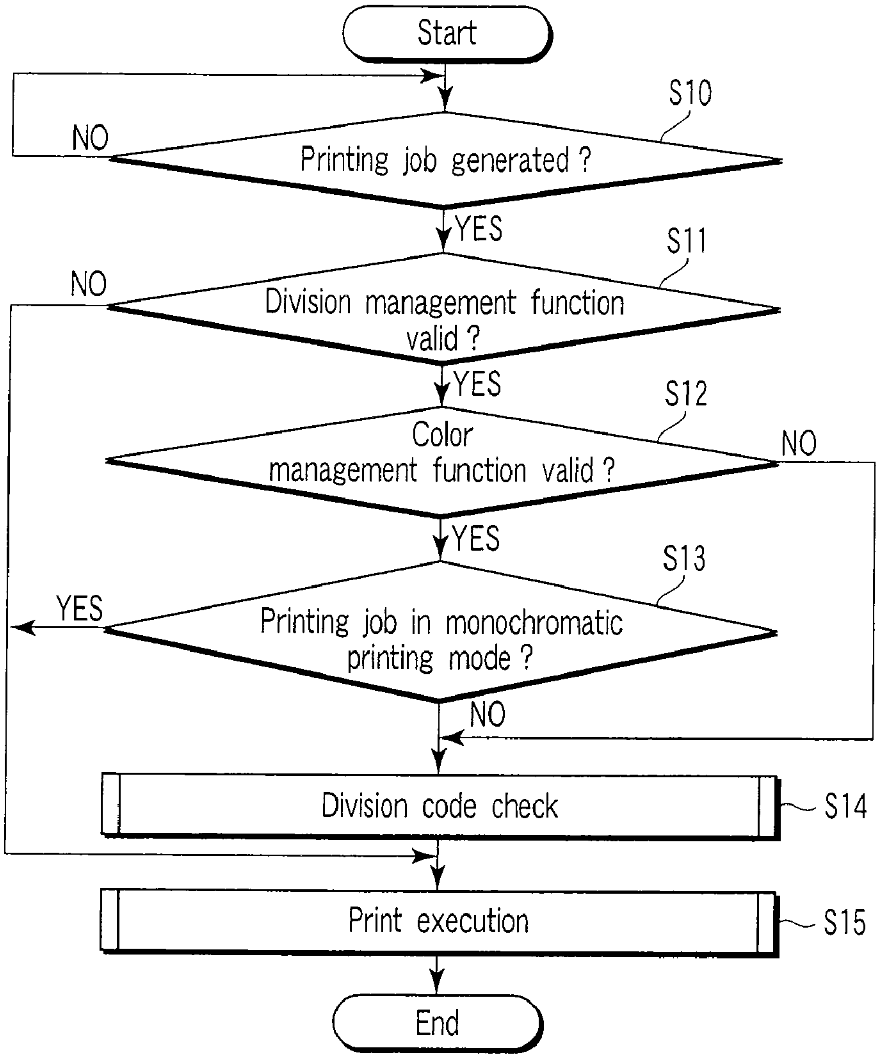
FIG. 4 is a flowchart schematically showing a printing control with respect to a printing job in the digital multifunction machine.

FIG. 4 is a flowchart schematically showing the printing control in a case where the printing job is generated.

In the MFP 1, in a usual operation state, there is accepted a printing job generated by the photocopying function, the network printing function, the facsimile function or the like (step S10). In this state, for example, in a case where the printing request is received from the PC 2 as the network printing function, the draft image is read by the scanner as the photocopying function, facsimile data is received as the facsimile function, or a request for list output is received, one printing job is generated in the MFP 1.

When such printing job is generated (step S10, YES), the CPU 21 of the system control unit 11 judges whether or not the division management function is valid (step S11). In a case where this judgment is that the division management function is invalid (step S11, NO), the CPU 21 allows the printer unit 14 to execute the print processing with respect to the printing job (step S15). That is, in a case where the division management function is invalid, the printing job is other than the management object of the division management function. Therefore, the system control unit 11 does not count the number of the pages printed as the printing job.

Moreover, in a case where the above judgment is that the division management function is valid (step S11, YES), the CPU 21 judges whether or not the color management function is valid (step S12). In a case where this judgment is that the color management function is valid, the CPU 21 judges whether or not the printing job has a monochromatic printing mode (step S13).

In a case where this judgment is that the printing job has the monochromatic printing mode (step S13, YES), the CPU 21 executes the print processing in the monochromatic printing mode with respect to the printing job (step S15). That is, in a state in which both of the division management function and the color management function are valid, the CPU 21 executes the print as the printing job without checking any division code. This indicates that the input of the division code by the user is not required in a case where both of the division management function and the color management function are valid. In this case, the printer unit 14 performs the monochromatic print in a state in which both of the division management function and the color management function are valid. Therefore, in the system control unit 11, the number of the printed pages (the number of the monochromatically printed pages) during the printing operation in the printer unit 14 is counted up in the division undefined counter 30.

Moreover, in a case where that the judgment is that the color management function is invalid, that is, even in a case where it is judged that the division management function is valid and the color management function is invalid (step S12, NO), the CPU 21 checks the division code (step S14). The above division code check is division code identification processing to determine the division of the user who has requested the printing job. When the division is determined by the above division code check, the CPU 21 allows the printer unit 14 to execute the print processing with respect to the printing job (step S15). In this case, the division management function is valid, and the color management function is invalid. Therefore, in the system control unit 11, the division counter 31 is counted up in accordance with the number (the number of the chromatically and monochromatically printed pages) of the printed pages to be counted during the printing operation of the printer unit 14.

Furthermore, in a case where the above judgment is that the mode is not the monochromatic printing mode (i.e., the mode is the full color mode or the auto color mode) (step S13, NO), the CPU 21 checks the division code for identifying the division of the user who has requested the printing job (step S14). When the division is determined by this division code check, the CPU 21 allows the printer unit 14 to execute the print processing with respect to the printing job (step S15). In this case, both of the division management function and the color management function are valid. Therefore, as to the number of the printed pages to be counted during the printing operation in the printer unit 14, the system control unit 11 counts up the number of the chromatically printed pages in the division counter 31, and counts up the number of the monochromatically printed pages in the division undefined counter 30.

Figure 5:
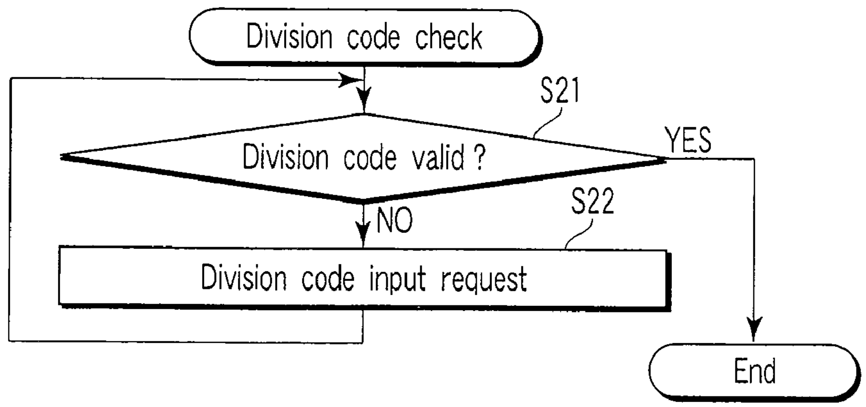
FIG. 5 is a flowchart showing a processing example of division code check.

FIG. 5 is a flowchart showing a processing example of the division code check. As shown in FIG. 5, in this division code check, the CPU 21 judges whether or not the division code designated by the user is valid (step S21). In a case where this judgment is that the division code designated by the user is not valid or that any division code is not designated by the user (step S21, NO), the CPU 21 requests the user who has requested the printing job to input the division code (step S22).

As this request to the user for the input of the division code, the CPU 21 allows, for example, the operation panel 12 to display that the division code be input. In a case where the above judgment is that the division code designated by the user is valid (step S21, YES), the CPU 21 determines the division code as the division of the printing job, and ends the division code check.

Next, there will be described set processing of the color management function.

As described above, in the color management function, the number of the pages printed in the monochromatic mode is not counted in the division counter 31, and is counted in the division undefined counter 30. Therefore, in a case where the color management function is valid, the print or the photocopy in the monochromatic mode can limitlessly be executed even unless the division is determined.

In the present embodiment, in a case where the color management function is valid, that is, the color management function is set to a valid state, the photocopying mode (or the printing mode) is forcibly set to the monochromatic mode in the initial state. Accordingly, the photocopy or the print in the monochromatic mode which can limitlessly be executed can be indicated by less operation procedures, and operability can be improved. Therefore, in the present embodiment, in a case where the color management function is set, an initial value of the photocopying mode or the printing mode (hereinafter also referred to simply as the printing mode) is set to the monochromatic mode.

Figure 6:
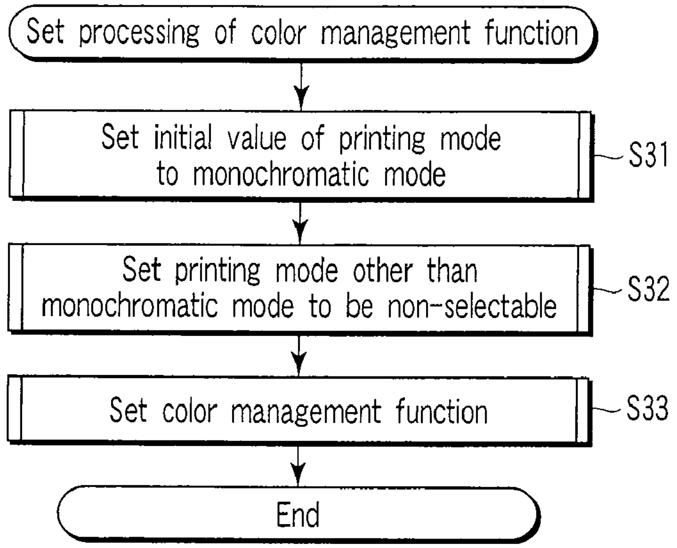
FIG. 6 is a flowchart showing setting of a color management function.

FIG. 6 is a flowchart showing an example of the set processing of the color management function.

A setting operation of the color management function is executed using the operation panel 12. The setting operation of the color management function is usually performed by a manager.

For example, when the manager instructs setting and registering in the operation panel 12, the display section 41 of the operation panel 12 displays a setting and registering screen. When the manager instructs the setting of the manager in this setting and registering screen, the display section 41 displays a manager setting screen.

When the manager instructs the setting of a device in this manager setting screen, a device setting screen is displayed in the display section 41. In this device setting screen, the setting of the color management function is displayed as a selectable menu item.

When this setting of the color management function is instructed, the display section 41 displays a setting screen for setting the color management function to be valid or invalid. In this display state, the manager indicates that the color management function is set to be valid. When it is indicated that such color management function is set to be valid, the CPU 21 starts set processing of the color management function.

When it is indicated that the color management function is set to be valid as described above, the CPU 21 sets, to a monochromatic mode, an initial value (initial value of the printing mode) displayed as the printing mode in an initial state of the screen displayed in the display section 41 (step S31).

In a setting other than that of the color management function, during the set processing of the initial value of the printing mode, any of a full color mode, an auto color mode and the monochromatic mode is usually set as the initial value of the printing mode in accordance with manager's selection.

That is, in the set processing of the initial value of the usual printing mode, the mode other than the monochromatic mode, such as the full color mode or the auto color mode, can be selected. However, in the present embodiment, the color management function is set to be valid in the set processing of the color management function. Therefore, the mode other than the monochromatic mode cannot be selected as the initial value of the printing mode (step S32). When the initial value of such printing mode is set, the CPU 21 sets the color management function to be valid (step S33), and ends the set processing of the color management function.

The above set processing sets the color management function to valid, and sets the initial value of the printing mode to be monochromatic. Therefore, in a case where the color management function is valid, the photocopying mode (or the printing mode) can forcibly be set to the monochromatic mode in the initial state. As a result, it is possible to execute, by a minimum operation, the photocopy or the print in the monochromatic mode which can limitlessly be executed, when the color management function is valid, and the operability can be improved.

Next, there will be described initialization of the printing mode to be displayed in the display section 41 of the operation panel 12.

In each item of the screen displayed in the display section 41 of the operation panel 12, display contents in the initial state are set as the initial values, respectively. These initial values are information set beforehand. Therefore, in a case where it is judged that the screen of the display section 41 is set to the initial state, the CPU 21 of the system control unit 11 displays, in the screen, the contents in accordance with the initial values as described above.

Figure 7:
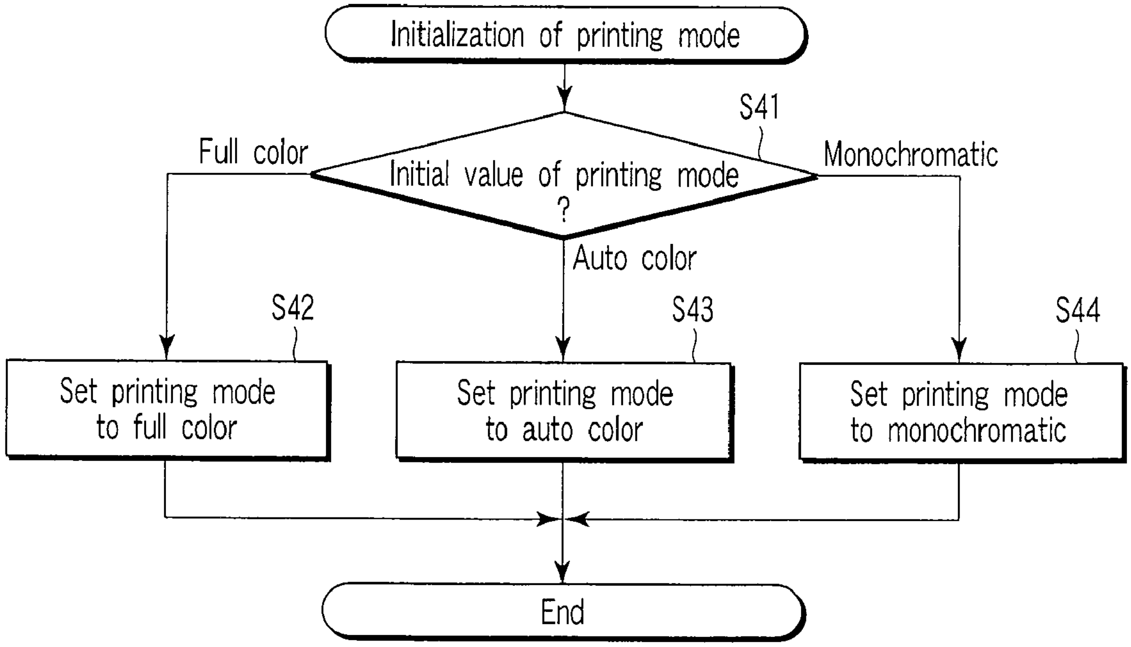
FIG. 7 is a flowchart showing initialization of a printing mode.

FIG. 7 is a flowchart showing the initialization of the printing mode as one of the initial values.

In a case where it is judged that the printing mode to be displayed in the display section 41 is initialized, the CPU 21 reads out the initial value of the printing mode set beforehand. In the present embodiment, the printing mode includes the full color mode, the auto color mode and the monochromatic mode. Therefore, the CPU 21 judges that any of the full color mode, the auto color mode and the monochromatic mode is the initial value of the printing mode based on the read initial value (step S41).

In a case where this judgment is that the read initial value of the printing mode is the full color mode (step S41, full color), the CPU 21 sets the printing mode to the full color mode (step S42). As a result, it is indicated that the printing mode is the full color mode in the initial state (e.g., a photocopying screen in the initial state) of the screen having a printing mode display region.

Moreover, in a case where the above judgment is that the read initial value of the printing mode is the auto color mode (step S41, auto color), the CPU 21 sets the printing mode to the auto color mode (step S43). As a result, it is indicated that the printing mode is the auto color mode in the initial state (e.g., the photocopying screen in the initial state) of the screen having the printing mode display region.

Furthermore, in a case where the above judgment is that the read initial value of the printing mode is the monochromatic mode (step S41, monochromatic), the CPU 21 sets the printing mode to the monochromatic mode (step S44). As a result, it is indicated that the printing mode is the monochromatic mode in the initial state (e.g., the photocopying screen in the initial state) of the screen having the printing mode display region.

Here, there is presumed a case where the color management function is valid. In this case, in the set processing of the color management function, the full color mode or the auto color mode cannot be selected (set), and the monochromatic mode is set as the initial value of the printing mode. In other words, in a case where the color management function is valid, the initial value of the printing mode is monochromatic. Therefore, the monochromatic mode is displayed as the printing mode in the initial state (e.g., the photocopying screen in the initial state) of the screen having the printing mode display region.

On the other hand, in a case where the color management function is not valid, the full color mode and the auto color mode can be selected (set) as the initial value of the printing mode. In other words, in a case where the color management function is invalid, any of the full color mode, the auto color mode and the monochromatic mode selected by the user or the manager is displayed as the printing mode in the initial state (e.g., the photocopying screen in the initial state) of the screen having the printing mode display region.

Next, there will be described a display control of the display section 41 of the operation panel 12.

Figure 8:
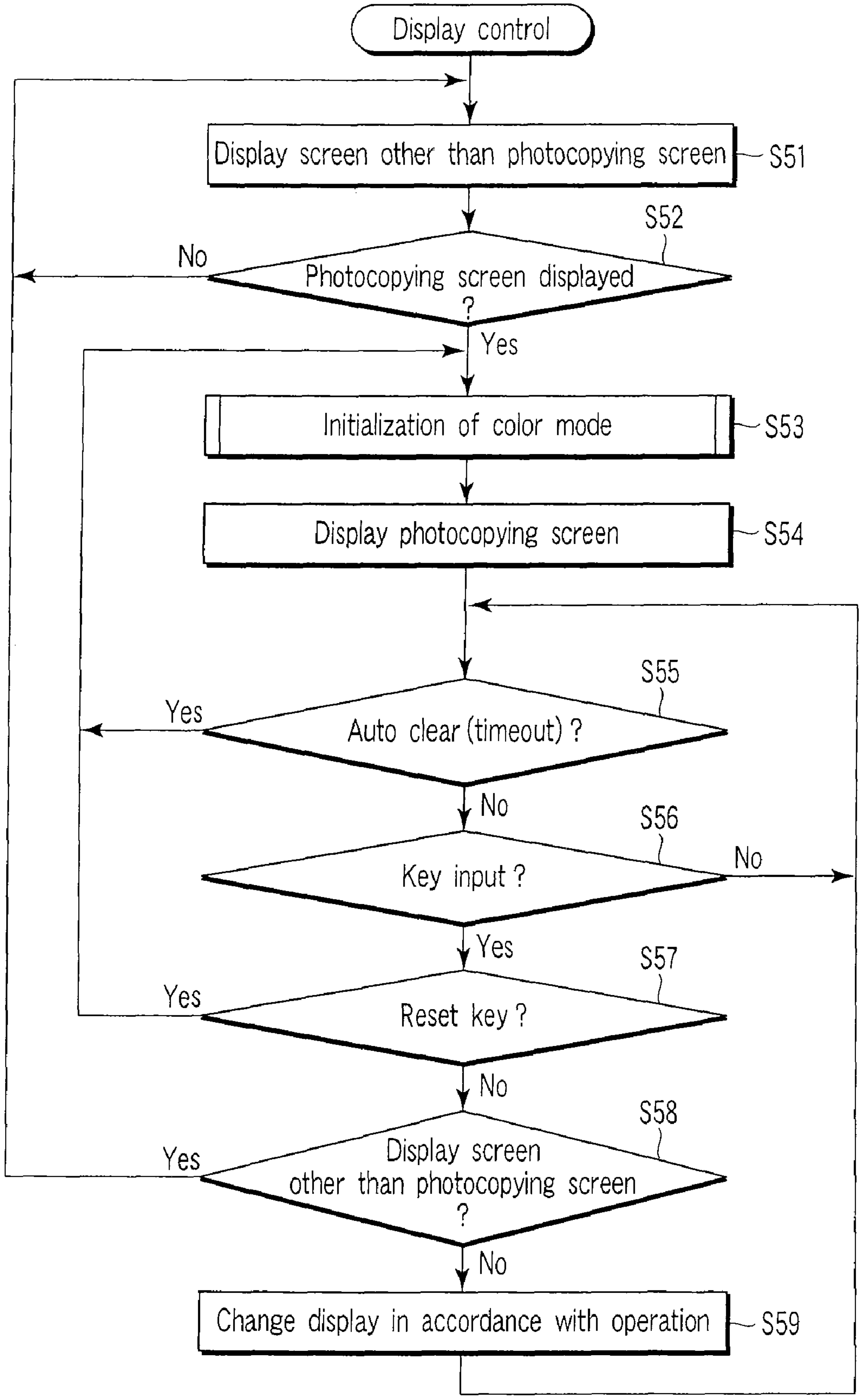
FIG. 8 is a flowchart showing a display control with respect to a display unit of the operation panel.

FIG. 8 is a flowchart showing the display control of the display section 41. It is to be noted that here in the description, there is presumed a case where both of the division management function and the color management function are valid.

First, it is assumed that in the display section 41 of the operation panel 12, there is displayed a screen other than a photocopy setting screen (hereinafter referred to as the photocopy image) (step S51).

In a case where a function other than the photocopying function is indicated in this state (e.g., the scanning function selection key 42*a*, the FAX function key 42*c* or the like is indicated) (step S52, NO), the CPU 21 displays, in the display section 41, the setting screen in accordance with the indicated function (step S51).

Moreover, in a case where the photocopying function is indicated (e.g., the photocopying function selection key 42*b* is indicated), the CPU 21 judges that the photocopying screen is displayed in the display section 41 (step S52, YES). When it is judged that the photocopying screen is displayed, the CPU 21 initializes the above printing mode (step S53). Here, since the color management function is valid, the initial value of the printing mode is monochromatic. Therefore, as described above, the CPU 21 sets the monochromatic mode as the printing mode.

Figure 9:
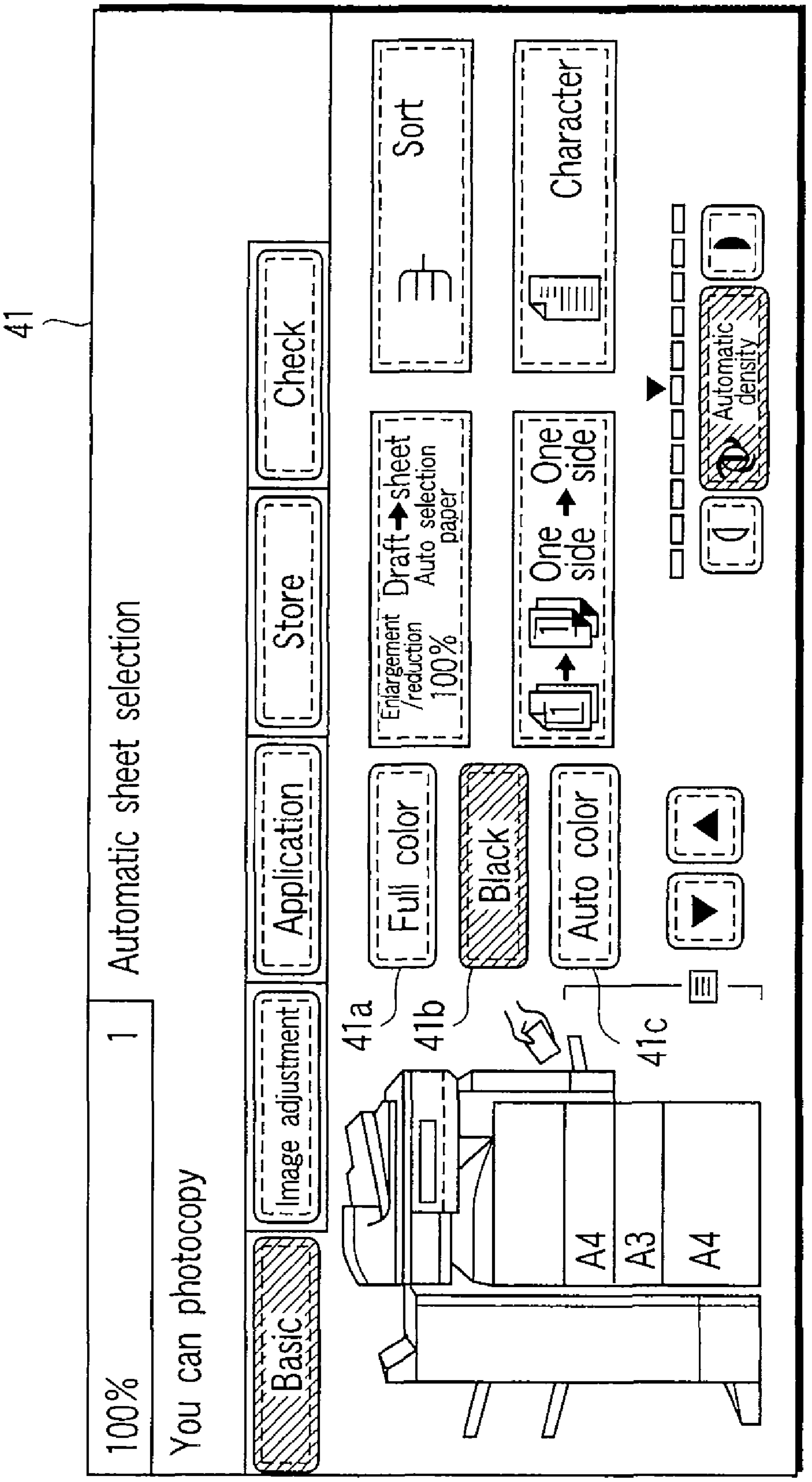
FIG. 9 is a diagram showing a display example of a photocopying screen in the display unit of the operation panel.

When the printing mode is initialized, the CPU 21 allows the display section 41 to display the photocopying screen which is set in the step S53 and in which the printing mode is reflected, that is, the photocopying screen in the initial state (step S54). FIG. 9 shows a display example of the photocopying screen in the initial state in a case where the color management function is valid. As shown in FIG. 9, in the photocopying screen of the initial state, a "monochromatic" key 41*b* is displayed (reverse-displayed) in a selected state among a "full color" key 41*a*, the "monochromatic" key 41*b* and an "auto color" key 41*c*. This indicates that the printing mode is monochromatic.

In a state in which such photocopying screen is displayed, the CPU 21 waits for the input of the instruction into various hardware keys of the operation panel 12 and various keys selectable in the touch panel displayed in the photocopying screen. In this state, the CPU 21 counts an elapsed time in a state in which there is not any input.

When such no-input state continues for a predetermined or more time, the CPU 21 judges timeout, and initializes (auto clear) the set contents displayed in the photocopying screen (step S55). In this case, the CPU 21 returns to the step S53, initializes the printing mode, that is, sets the printing mode to the monochromatic mode, and displays, in the display section 41, the photocopying screen of the initial state as shown in FIG. 9.

Moreover, when there is a key input in the above state (step S56, YES), the CPU 21 distinguishes the input key. Accordingly, when the input key is the reset key (step S57, YES), the CPU 21 returns to the step S53, initializes the printing mode, that is, sets the printing mode to the monochromatic mode, and displays in the display section 41 the photocopying screen of the initial state as shown in FIG. 9.

Furthermore, in a case where a key to display a screen other than the photocopying screen is input (step S58), the CPU 21 returns to the step S51, and displays in the display section 41 the screen corresponding to the input key. In a case where a key to change the setting of the photocopying screen is input, the CPU 21 changes the contents of the photocopying setting in response to the input key, and changes the display contents in the photocopying screen (step S59). In this case, the CPU 21 returns to the step S55, and repeats the above processing.

As described above, in the MFP of the present embodiment, in a state in which both of the division management function and the color management function are valid, the screen is switched to the photocopying screen, the reset key is indicated, or the state is switched to the initial state by, for example, automatically clearing the screen or resetting the screen otherwise, the initial value to be set as the printing mode of the printer unit 14 is set to the monochromatic mode.

In consequence, in a state in which both of the division management function and the color management function are valid, the printing mode in the initial state can forcibly be set to the monochromatic mode which can limitlessly be executed by the color management function. As a result, the user's operability can be improved.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. An image forming device comprising:

a printer which prints a color image on a medium and if an operation mode is a color mode, and prints a monochromatic image on a medium if an operation mode is a monochromatic mode;

a management unit which manages only the number of pages printed in the color mode by the printer for each division to which a user belongs, if a color management mode is valid;

a setting unit which sets an initial value of the operation mode of the printer to the monochromatic mode if the color management mode is valid, and sets an initial value of the operation mode of the printer to any of the color mode and the monochromatic mode if the color management mode is not valid; and the setting unit forcibly setting the operation mode of the printer to the monochromatic mode, when an operation to switch to an initial state is inputted, if the color management mode is valid.

2. The image forming device according to claim 1, further comprising:

a display unit which displays that the operation mode of the printer is the monochromatic mode based on the initial value of the operation mode of the printer set by the setting unit, when color management mode is valid so that the management unit manages only the number of the pages printed in the color mode for each division, each user belonging to the division, in a case where the user switches a setting state to an initial state.

3. The image forming device according to claim 1, further comprising:

a display unit which displays that the operation mode of the printer is the monochromatic mode based on the initial value of the operation mode of the printer set by the setting unit, when color management mode is valid so that the management unit manages only the number of the pages printed in the color mode for each division, each user belonging to the division, in a case where a predetermined time elapses while there is not any operation by the user.

4. The image forming device according to claim 1, further comprising:

a control unit to prohibit the operation mode of the printer from being set to the color mode until the division to which the user belongs is determined, in a state in which it is displayed in the display unit that the printer is brought into the monochromatic mode.

5. The image forming device according to claim 4, further comprising:

a display unit which displays that the operation mode of the printer is the monochromatic mode until the division of the user is determined and which switches the operation mode of the printer to the color mode to be displayed in the display unit in response to a user's request for print processing in the color mode, in a case where the division of the user is determined.

6. A method of managing an image forming device comprising:

printing a color image on a medium if an operation mode of a printer is a color mode;

printing a monochromatic image on a medium if an operation mode of the printer is a monochromatic mode;

managing only the number of pages printed in the color mode by the printer for each division to which a user belongs, if a color management mode is valid;

setting an initial value of the operation mode of the printer to the monochromatic mode if the color management mode is valid, and setting an initial value of the operation mode of the printer to any of the color mode and the monochromatic mode if the color management mode is not valid; and forcibly setting the operation mode of the printer to the monochromatic mode, when an operation to switch to an initial state is inputted, if the color management mode is valid.

7. The method of managing the image forming device according to claim 6, further comprising:

displaying in the display unit that the operation mode of the printer is the monochromatic mode based on the initial value of the set operation mode of the printer, when the color management mode is set to manage only the number of pages having an image formed thereon in the color mode for each division, each user belonging to the division, in a case where the user switches a setting state to an initial state.

8. The method of managing the image forming device according to claim 6, further comprising:

displaying in the display unit that the operation mode of the printer is the monochromatic mode based on the initial value of the set operation mode of the printer, in a case where the color management mode is set to manage only the number of the pages printed in the color mode for each division, each user belonging to the division, in a case where a predetermined time elapses while there is not any operation by the user.

9. The method of managing the image forming device according to claim 6, further comprising:

prohibiting the operation mode of the printer from being set to the color mode until the division to which the user belongs is determined, in a state in which it is displayed in the display unit that the printer is brought into the monochromatic mode.

10. The method of managing the image forming device according to claim 9, further comprising:

switching the operation mode of the printer to the color mode to be displayed in the display unit in response to a user's request for print processing in the color mode, in a case where the division to which the user belongs is determined.

11. An image forming device comprising:

image forming means for printing a color image on an image forming medium if an operation mode is a color mode, and for printing a monochromatic image on an the image forming medium if an operation mode is a monochromatic mode;

management means for managing only the number of pages having the image formed thereon in the color mode by the image forming means for each division to which each user belongs if a color management mode is valid;

setting means for setting an initial value of the operation mode of the image forming means to the monochromatic mode if the color management mode is valid; and for setting an initial value of the operation mode of the image forming means to any of the color mode and the monochromatic mode if the color management mode is not valid; and the setting unit forcible setting the operation mode of the printer to the monochromatic mode, when an operation to switch to an initial state is inputted, if the color management mode is valid.

12. The image forming device according to claim 11, further comprising:

display means for displaying that the operation mode of the image forming means is the monochromatic mode based on the initial value of the operation mode of the image forming means set by the setting means, when the color management mode is valid so that the management means manages only the number of the pages having the image formed thereon in the color mode for each division, each user belonging to the division, in a case where the user switches a setting state to an initial state.

13. The image forming device according to claim 11, further comprising:

display means for displaying that the operation mode of the image forming means is the monochromatic mode based on the initial value of the operation mode of the image forming means set by the setting means, when the color management mode is valid so that the management means manages only the number of the pages having the image formed thereon in the color mode for each division, each user belonging to the division, in a case where a predetermined time elapses while there is not any operation by the user.

14. The image forming device according to claim 11, further comprising:

control means for prohibiting the operation mode of the image forming means from being set to the color mode until the division to which the user belongs is determined, in a state in which it is displayed in the display means that the image forming means is brought into the monochromatic mode.

15. The image forming device according to claim 14, further comprising:

display means for displaying that the operation mode of the image forming means is the monochromatic mode until the division of the user is determined and for switching the operation mode of the image forming means to the color mode to be displayed in the display means in response to a user's request for print processing in the color mode, in a case where the division of the user is determined.

* * * * *